March 21, 1939. R. P. FISHER 2,151,347
ROTARY DRILL BIT
Filed Feb. 14, 1938 2 Sheets-Sheet 1
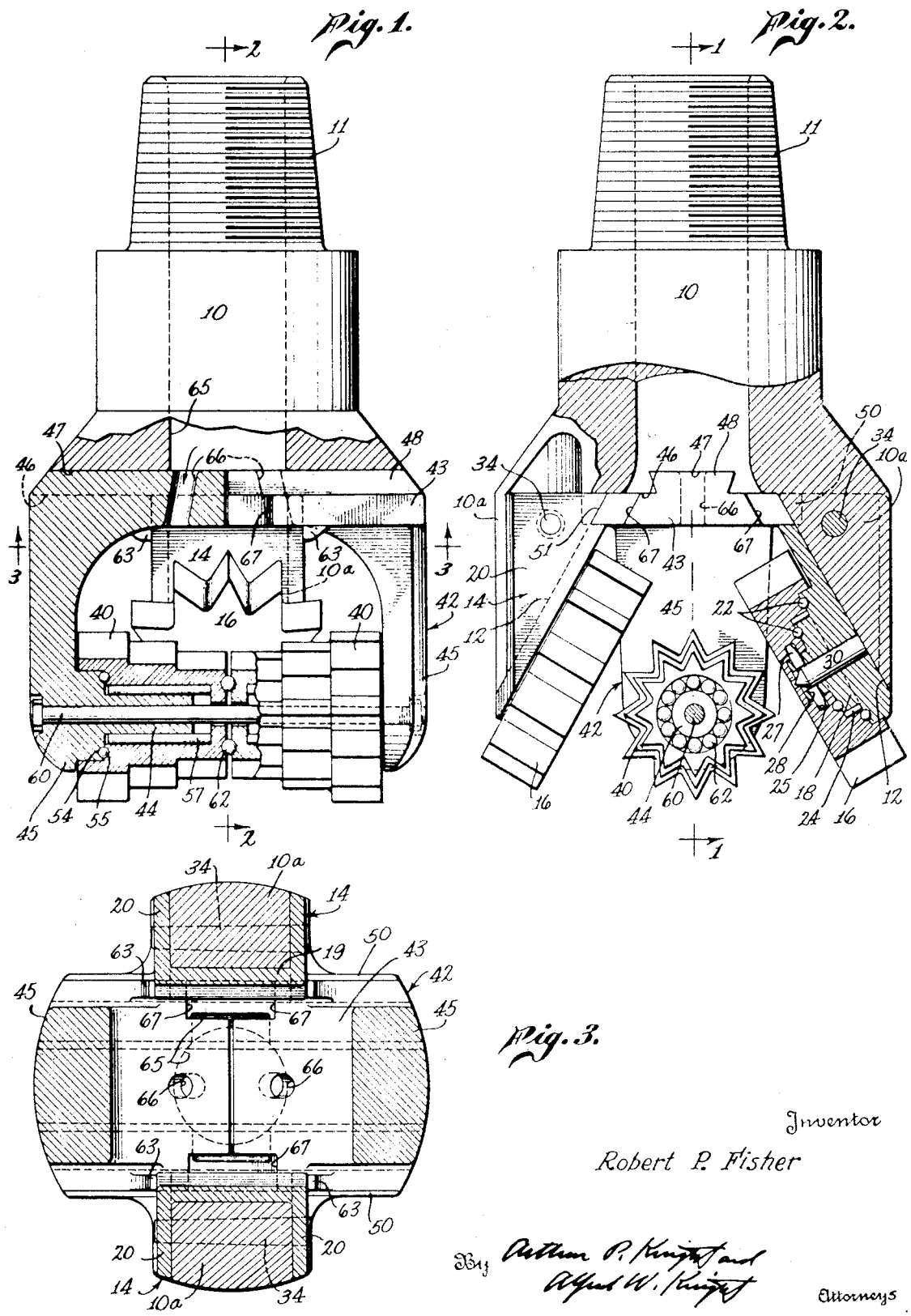
Inventor
Robert P. Fisher Patented Mar. 21, 1939

2,151,347

UNITED STATES PATENT OFFICE 2,151,347

ROTARY DRILL BIT

Robert P. Fisher, Los Angeles, Calif., assignor of fifty-one per cent to Rudolph Pageman, Los Angeles, Calif.

Application February 14, 1938, Serial No. 190,444

17 Claims. (Cl. 255—71)

The present invention relates generally to earth-boring tools of the type used in drilling oil wells and the like, and more particularly to rotary drill bits having cutters rotatably mounted upon a shank member.

It becomes a general object of my invention to provide a drill bit in which both the cutters and the cutter bearings are detachable from the shank which consequently has no parts that are worn out during the drilling operations.

It is also a general object of the invention to provide a bit with detachable cutters and cutter bearings, that can be assembled easily and securely by methods other than welding and which has sufficient strength to withstand all the loads which may be imposed upon the tool.

Another object of the invention is to provide a drilling bit with rotatable cutters that are easily removed and replaced by new ones under field conditions, the assembly and disassembly of the bit being accomplished quickly and easily without the use of special tools, welding torches, or other equipment available only in shops.

Another object is to provide a drilling bit that is simple and strong in construction and provides maximum life for all parts in order that the cost of the bit measured by the footage of hole drilled may be kept to a minimum.

The above objects of my invention, as well as others not specifically mentioned, are attained by providing, in a bit having a shank, a plurality of detachable cutter bearing members of which each comprises a journal bearing and a body portion enabling attachment to the shank, and cutters rotatably mounted upon the journal bearings. In a preferred type of bit, these cutter bearing members may be of more than one type in order to accommodate cutters of various shapes and locate these cutters on the bit as needed to remove formation most effectively. The shank has a pair of integral legs extending downwardly from opposite sides of the shank body, and these legs each have a substantially plane thrust surface. Attached to each leg is a bearing member formed with a journal bearing integral with a body having a surface adapted to bear against the shank thrust surface in load-transmitting relation. The roller cutters mounted upon these bearing members are of relatively short axial dimensions and extend outwardly at their lower portions to the extreme diameter of the hole drilled by the bit. Alternating with the integral legs on the shank, are a pair of detachable legs secured to the shank and extending downwardly from the shank body at opposite sides. These legs are also portions of two cutter bearing members attached to the shank body and having journal bearing portions which are alined with each other, so that a tie-bolt passing axially of said bearings extends through the lower ends of both of the detachable legs and holds them against relative movement. These latter cutter bearing members are preferably attached to the shank body by horizontal sliding engagement with the shank. The cutters rotatably mounted upon these latter journal bearings are of relatively long axial dimensions and remove formation from the center of the hole being drilled.

How the above and other objects and advantages of my invention are attained will be better understood by reference to the following description and the annexed drawings, in which:

Fig. 1 is a combined vertical section and elevation of a preferred form of my invention, with the lower left-hand portion of the bit shown in vertical median section on line 1—1 of Fig. 2, and the cutter-bearing member and cutter at the right-hand side of the bit shown in elevation;

Fig. 2 is a vertical section of the bit on line 2—2 of Fig. 1, except that the cutter and cutter-bearing member at the left-hand side of the bit are shown in elevation;

Fig. 3 is a horizontal section looking upwardly on line 3—3 in Fig. 1;

Figure 4:
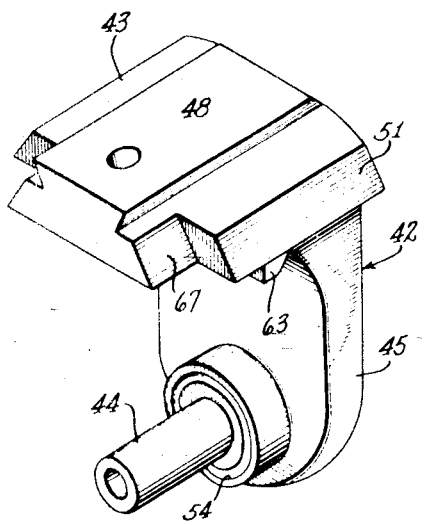
Fig. 4 is a perspective of one type of cutter-bearing member detached from the bit.

The drill bit illustrated in Figs. 1 and 2 comprises a shank 10 having on its upper end threaded pin 11 by which the bit is adapted for attachment to a drill stem, not shown, for rotation by the drill stem. The drill stem rotates the bit about its longitudinal axis, which is normally generally vertical and under usual conditions coincides with the axis of the hole being drilled by the bit through the earth. It will be understood that when in the following description directional terms, such as "horizontal" or "vertical", are used, these terms are merely descriptive of the drill bit and are characteristic of the usual or normal position of the tool, but are not to be construed as limitative upon the invention merely because the longitudinal axis may also be inclined to a greater or lesser extent under drilling conditions.

The main body portion of shank 10 is generally cylindrical in shape and has a pair of integral legs 10a which extend downwardly from the body at opposite sides of the shank. As may be seen best in Figs. 2 and 3, depending legs 10a are generally rectangular in horizontal cross-section, and taper downwardly to a point, so that the inner face 12 of each leg is inclined downwardly and outwardly. Thrust surfaces 12 receive the upward thrust from certain of the cutters, as will be more fully explained, and are preferably substantially plane surfaces, though they may be given other shapes if desired. The vertical side faces of a leg 10a at either side of the thrust surface are preferably parallel to each other and transverse to the thrust surface.

Upon each one of depending legs 10a is fastened a cutter-bearing member or support generally indicated at 14, and a roller cutter 16 is rotatably mounted upon the bearing member 14. This type of bearing supporting member 14 alone is shown in greater detail in Fig. 5. Cutter-bearing member 14 comprises a journal bearing portion 18, upon which a cutter 16 is rotatably mounted, and a flat, plate-like body 19 disposed substantially at right angles to the axis of journal bearing and having a pair of triangularly shaped side wings 20 formed integrally with body 19 and extending transversely thereto. Although the cutter bearing 18 may take other shapes, it is here shown as composed of a number of stepped sections of different diameters, and the radial faces between the successive sections are formed with semicircular annular grooves 21 which serve as races to hold a plurality of balls 22 that form thrust bearings, as shown in Fig. 2, for absorbing the thrust axially of the journal bearing. If desired, roller bearings 24 may be placed around one or more sections of journal bearing 18 to help reduce friction between the bearing and cutter.

As part of the means for locking cutter 16 onto the journal bearing, the cutter is provided with an annular groove 25 in an interior bearing surface. At a corresponding position on journal bearing 18, there is placed a plurality of studs 27 which are slidably mounted in radial bores 28 in the journal bearing. Taper pin 30 slides in an axial bore within the journal bearing, and when the pin is moved forward to the advanced position shown in Fig. 2, it forces studs 27 radially outward and into annular groove 25 to engage cutter 16 and hold it against axial movement on the journal bearing. When taper pin 30 is withdrawn, studs 27 fall inwardly and disengage the cutter groove so that the cutter may be removed from the bearing.

Cutter-bearing member 14, with its cutter 16, is mounted on a depending shank leg 10a with the flat back face of body 19 bearing against thrust surface 12 in load-transmitting relation. Bearings 18 extend downwardly and inwardly toward the center of the hole, and are supported only at their outer ends where they are integral with bodies 19. Wings 20 engage the side faces of leg 10a to hold the cutter bearing member and cutter against horizontal movement with respect to the shank. A tapered drift pin 34 is driven through alined openings in wings 20 and leg 10a to hold the bearing member and cutter against any vertical movement with respect to the shank and complete the fastening of the bearing member to the shank.

The inclination of cutters 16 causes them to extend outwardly beyond the diameter of the shank at their under side and, as they cut to the full diameter of the hole, they determine the diameter of the hole drilled. Because of their relatively short axial dimension, cutters 16 are effective only in an annular path around the periphery of the hole and do not remove formation from the central portion of the hole. Operation in this latter area is confined to a pair of roller cutters 40 each of sufficient axial length to extend from substantially the center of the hole outwardly to the path of cutters 16. Cutters 40 are likewise rotatably mounted upon cutter-bearing members 42 or supports that are detachable from the shank; and both members 42 are similar in construction, as shown in Fig. 4, so that a description of one member applies equally to the other.

Figure 7:
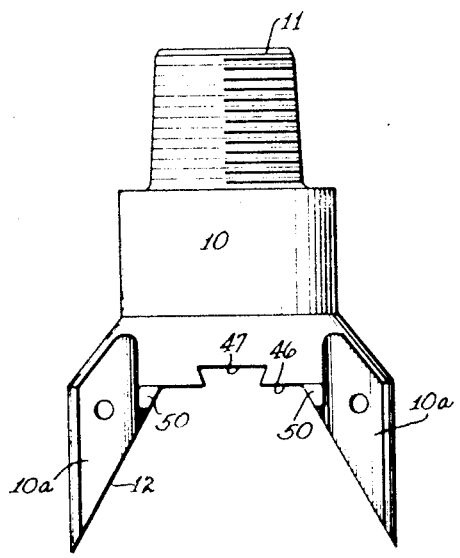
Fig. 7 is a side elevation of the shank alone viewed as in Fig. 2.

As shown best in Fig. 4, each cutter-bearing member 42 may be described as being of a general U-shape, and comprises an upper horizontally extending portion 43 of a suitable shape to attach the member to the shank, a lower horizontally extending journal bearing portion 44 upon which a cutter 40 is rotatably mounted, and a vertically extending leg 45 that joins the two horizontal portions 43 and 44 at their outer ends and forms in effect a detachable leg of the shank. The under surface 46 of shank 10 in the space between legs 10a is made horizontal so that the upper flat surface of portion 43 of bearing member 42 can bear against the shank surface with as large an area of contact as possible and transmit to the shank the loads applied to the cutters. In this under surface of the shank there is cut a horizontal, transverse slot 47 of wedge-shaped cross-section as shown in Fig. 2, with its inner or upper end wider than where it intersects shank surface 46. Bearing supporting member 42 has a wedge-shaped tenon 48 rising above the top of plate 43 and adapted to be slidingly engaged in shank slot 47 to form a dovetail connection with the shank that securely holds the bearing member in place except against movement parallel to the length of slot 47. Drilling torque is transmitted to the bearing member in the form of shear between tenon 48 and plate 43; and additional lateral support for this purpose is afforded plate 43 by marginal ribs 50 (Figs. 2 and 7) on the shank formed with sloping faces that engage the sloping side faces 51 of plate 43. Although these side faces on the plate and ribs may be made vertical if desired, it is preferred that they be inclined as shown because the shank and bearing member are better kept in tight engagement.

The vertically extending portion 45 of the cutter-bearing member may be considered as a detachable leg of the shank that supports from the shank body the horizontal journal bearing 44, which is integral with the leg and extends substantially at right angles thereto. Journal bearing 44 is made in two sections of different diameters. The vertical face between the sections has a semicircular annular groove 54 forming a portion of a ball-race that holds a number of ball bearings 55 to provide a thrust bearing that absorbs the endwise thrust of cutter 40 against the journal bearing. It is preferred that roller bearings 57 be inserted between the main portion of the journal bearing and the cutter to further reduce friction; but such roller bearings may be omitted, and in this latter case the cutter will bear directly upon the cylindrical portion of the journal bearing.

In the assembled bit, as shown in Fig. 1, tie-bolt 60 passes axially through the two journal bearings 44 and the lower ends of both legs 45 to hold the two opposed cutter-bearing members 42 against relative movement. The outer faces of shank legs 45 are provided with suitable recesses to receive the head of bolt 60 and the nut threaded onto the other end of the bolt. Where the horizontal tie-bolt passes through the inner ends of cutters 40, there is sufficient clearance to insure that the cutters do not ride upon the bolt but receive all their bearing support from journal bearings 44. This arrangement relieves bolt 60 of any vertical loads tending to produce bending in it and allows it to be used solely to hold the two cutter-bearing members 42 against separating. Cutters 40 are held snugly together by tension in bolt 60 and mutually support one another because of a plurality of balls 62 held in a race formed by complementary semicircular annular grooves in the end faces of cutters 40. These ball bearings 62 form a thrust bearing that prevents the cutters from binding against each other and yet holds them snugly on their journal bearings without unnecessary end play.

The procedure in assembling a bit is first to mount a cutter 40 upon each of the two cutter bearing members 42. The cutter-bearing members and their attached cutters are then separately attached to the shank by inserting tenons 48 in groove 47 and horizontally sliding the members 42 into place, from opposite ends of groove 47. The horizontal bearing surfaces on the shank and cutter-bearing member are substantially flat and slide over one another although they are in engagement to transmit vertical loads. As cutters 40 near each other, balls 62 are inserted in the race of one cutter. The two cutters are then brought together, and locked in place by tie-rod 60. A small clearance is preferably left between the adjoining ends of plate portions 43 in order that the cutters may be seated snugly upon their bearings and all endwise motion taken up by tie-bolt 60.

The next step is to mount a cutter 16 upon each journal bearing 18, and then lock the cutter in place by inserting pin 30 to force studs 27 outwardly. One assembled cutter and its support 14 are then attached to the shank by sliding plate 19 and wings 20 substantially vertically on depending leg 10a until the back face of the plate is in contact with thrust surface 12, when drift pin 34 may be driven home to complete the assembly. The other cutter 16 and its bearing member is then assembled and mounted on the shank in the same manner. Assembly of the complete bit requires no welding at all, and every part that has any material amount of wear on it is detachable from the shank which is thus capable of re-use many times. A single wrench to loosen tie bolt 60 and a punch to drive out pins 34 are the only tools required to disassemble the bit on a drilling rig for replacement of worn cutters.

Figure 5:
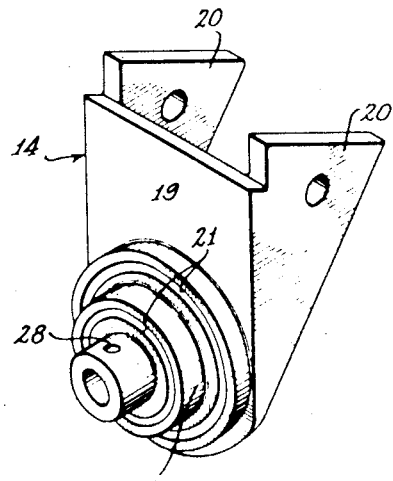
Fig. 5 is a perspective of another type of cutter-bearing member detached from the bit.
Figure 6:
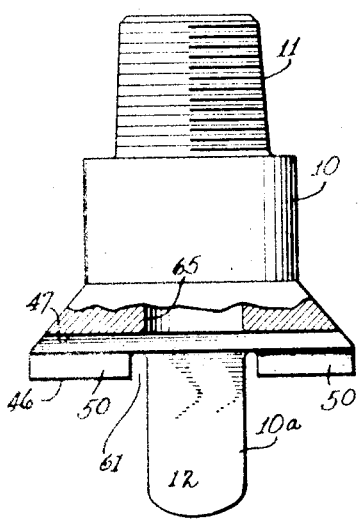
Fig. 6 is a vertical median section of the shank alone viewed as in Fig. 1.

As shown in Figs. 2 and 5, the upper end of cutter supporting member 14 is notched to conform to the shape of horizontal plates 43 and the upper end of plate 19 bears against the under surface of plate 43. Likewise, a gap 61 is left between ribs 50 and legs 10a as shown in Fig. 6 to receive the upper end of a wing 20. In this way members 14 help support and hold in place the upper portions 43 of members 42; and in the event the sides of tenons are made vertical, the upper ends of plates 19 hold the members 42 from dropping off the shank. No great load is imposed on plates 19, only the weight of the members and the cutters, for the heavy loads of drilling are upward against the thrust surfaces 12 and 46 on the shank. Of course cutter supporting members 14 may be shaped to offer no support to members 42 and be used entirely separately and independently of the latter members.

On the bottom face of each plate 43 is a pair of lugs 63, one at each edge of the plate (see Figs. 3 and 4). These lugs engage bearing supports 14; and the lugs on opposed members 42 are spaced apart by the width of a support 14 so that the lugs bear against the outer faces of wings 20, to prevent lateral displacement of cutter supports 42 which are tied together in one unit by bolt 60 which holds them against movement relative to each other, and both together, considered as a body, are held against sliding movement relative to the shank by engagement of lugs with bearing members 14.

Shank 10 contains a central passage 65 through which circulation fluid is received from the drilling stem. The horizontal extensions 43 of the two cutter-bearing members 42 cover the lower end of passage 65, and consequently fluid passages or openings are formed in plates 43 in order to conduct fluid from the interior of the shank downwardly to the several cutters on the bit. A fluid passage 66 through each of plates 43 communicates with shank passage 65 and discharges circulation fluid downwardly onto a cutter 40 beneath the opening. The plate portions 43 are also notched at each forward corner at 67, the two adjoining notches thus forming a rectangular opening which receives circulation fluid from the flared lower end of passage 65 and discharges the fluid against the upper surface of cutters 16.

From the foregoing description it will be seen that two roller cutters 40 are mounted on cutter supporting members 42 that include what are, in effect, detachable shank legs. These members 42 are separately detachable from the shank to allow easy replacement of one or both cutters; and when in assembled position, the co-axial bearings bring the cutters into abutting relation. In this position, the two cutters mutually support each other, and the assembly, instead of acting as independent cutters on separate cantilever bearings, acts more nearly like a single bearing with cutters rolling over the central portion of the hole to cut away the formation, with each of cutters 40 free to rotate in a direction opposite to the other one. The remaining outside annular part of the hole is cut by cutters 16 which are rotated about downwardly and inwardly inclined axes in order to tilt the cutters and extend their contact with the formation out beyond the diameter of shank legs 10a. Because cutters 42 extend across the bit, no member can extend across the bit to support the bearings of the other cutters 16, and the bearings 18 are supported only at their outer ends. It will be readily apparent that because cutters 16 are on bearings supported only from the outer ends, more than two, for example three or four, cutters 16 and supporting members 14 may be used on a shank having as many legs 10a, and in this case cutters 40 and detachable legs 42 may be dispensed with, though the axial dimension of cutters 16 would then be increased to reach substantially to the center of the hole. Assembly of such a bit can be effected because all the supports for the cutters are placed in position on the shank by the same relative movement in an upward direction, as viewed in the drawings, and each cutter supporting member can be placed in position independently of and without interference from the others.

It will be seen from the above disclosure that various changes in construction and arrangement of parts may be made without departing from the spirit and scope of my invention; and I wish it understood that the foregoing is to be considered as illustrative of and not restrictive upon the appended claims.

I claim:

1. In a roller bit, a shank having a plurality of downwardly extending detachable legs secured thereto, a plurality of axially alined bearing supports respectively extending from each leg, a roller cutter rotatably mounted on each support, a thrust bearing engageable with adjacent ends of said cutters for maintaining them in axial position with respect to one another while permitting their relative rotation, and means within said bearing supports and free from radial bearing loads imposed by said cutters for holding said legs against relative movement and said cutters snugly against said thrust bearing.

2. In a roller bit, a shank, a pair of detachable legs secured to the shank extending downwardly therefrom at opposite sides, a pair of axially alined bearing supports respectively extending from each leg toward one another and each materially bridging the distance between its leg and the center line of the bit, a roller cutter rotatably mounted on each support, a thrust bearing for maintaining said cutters in axial position with respect to one another including rolling elements cooperable with adjacent ends of said cutters, and means within said bearing supports and free from radial bearing loads imposed by said cutters for holding said legs against relative movement and said cutters snugly against said thrust bearing.

3. In a roller bit, a shank, a pair of detachable legs secured to the shank extending downwardly therefrom at opposite sides, a pair of axially alined bearing supports respectively extending toward each other from each leg, a roller cutter rotatably mounted on each support, a thrust bearing for maintaining said cutters in axial position with respect to one another including races formed in adjacent cutter end faces and balls rollable in said races, and means within said bearing supports for holding said legs against relative movement and said cutter races in engagement with said balls.

4. In a roller bit, a shank, a pair of detachable legs secured to the shank extending downwardly therefrom at opposite sides, a pair of axially alined bearing supports, one integral with each leg, extending towards each other and each materially bridging the distance between its leg and the center line of the bit, a roller cutter rotatably mounted on each support, said bearing supports having external races thereon, races in said cutters, rolling elements between said races, a thrust bearing for maintaining said cutters in axial position with respect to one another including rolling elements cooperable with adjacent ends of said cutters, and means within said bearing supports and free from radial bearing loads imposed by said cutters for holding said legs against relative movement and said cutters snugly against said thrust bearing.

5. In a roller bit, a shank, a pair of detachable legs secured to the shank extending downwardly therefrom at opposite sides, a pair of axially alined bearing supports, one integral with each leg, extending towards each other and each materially bridging the distance between its leg and the center line of the bit, a roller cutter rotatably mounted on each support, said bearing supports having external races thereon, races in said cutters, rollers engageable with said races for transmitting end thrusts to its bearing support, a thrust bearing for maintaining said cutters in axial position with respect to one another including rolling elements cooperable with adjacent ends of said cutters, and a threaded rod within said bearing supports and free from radial loads on said bearing supports for holding said legs against relative movement and said cutters snugly against said thrust bearing.

6. In a rotary drill bit, a shank provided with a plurality of downwardly extending legs, each leg having a thrust surface, a cutter bearing member mounted on each leg, each bearing member having a surface engageable with said shank leg thrust surface in load transmitting relation, a plurality of cutter bearing members detachably secured to the shank with their side surfaces contiguous said leg thrust surfaces in load transmitting relation, and cutters rotatably carried by said cutter bearing members.

7. In a rotary drill bit, a shank provided with a pair of downwardly extending legs, a thrust surface on the shank between said legs, each leg having a thrust surface, a cutter bearing member mounted on each leg, each cutter bearing member having a surface engageable with said leg thrust surface in load transmitting relation, detachable means abutting said shank thrust surface, said means having side surfaces contiguous said leg thrust surfaces in load transmitting relation, a pair of legs extending from said means, and cutters rotatably carried by said cutter bearing members and legs extending from said means.

8. In a rotary drill bit, a shank provided with a pair of downwardly extending legs, a thrust surface on the shank between said legs, each leg having a thrust surface, a cutter bearing member mounted on each leg having a surface engageable with said leg thrust surface in load transmitting relation, detachable cutter bearing means intermediate said legs, said means having a plate portion abutting said shank thrust surface and having side surfaces contiguous said leg thrust surfaces, and cutters rotatably carried by said cutter bearing members and means.

9. In a rotary drill bit, a shank provided with a pair of downwardly extending legs, a thrust surface on the shank between said legs, each leg having a thrust surface, a cutter bearing member mounted on each leg having a surface engageable with said leg thrust surface in load transmitting relation, a pair of detachable cutter bearing members intermediate said legs, each detachable bearing member having an inwardly directed plate portion abutting said shank thrust surface and having side surfaces contiguous said leg thrust surfaces, and cutters rotatably carried by said cutter bearing members.

10. In a rotary drill bit, a shank provided with a pair of downwardly extending legs, a thrust surface on the shank between said legs, each leg having a thrust surface inclined downwardly and outwardly, a cutter bearing member mounted on each leg having a surface engageable with said leg thrust surface in load transmitting relation, a pair of detachable cutter bearing members intermediate said downwardly extending legs, each detachable bearing member having an inwardly directed plate portion abutting said shank thrust surface and having side surfaces complementary to and contiguous said leg thrust surfaces, and cutters rotatably carried by said cutter bearing members.

11. In a rotary drill bit, a shank provided with a plurality of downwardly extending legs, each leg having a thrust surface, cutter bearing means detachably secured to the shank, a cutter bearing member mounted on each leg having a surface engageable with said shank leg thrust surface in load transmitting relation, said means and bearing members being in overlapping engagement, and cutters rotatably carried by said cutter bearing members and means.

12. In a rotary drill bit, a shank provided with a plurality of depending legs, each leg having a thrust surface, cutter bearing members detachably secured to the shank, a cutter bearing member mounted on each leg having a surface engageable with said shank leg thrust surface in load transmitting relation and in overlapping engagement with said detachable bearing members, and cutters rotatably carried by said bearing members.

13. In a drill bit, a shank provided with a pair of depending legs, said shank having a thrust surface between said legs and each leg having a thrust surface, a pair of detachable cutter bearing members intermediate said legs, each detachable member having an inwardly directed plate portion abutting said shank thrust surface, a cutter bearing member mounted on each leg in overlapping engagement with said plate portions and having a surface engageable with said leg surface, and cutters rotatably carried by said cutter bearing members.

14. The combination defined in claim 9, said leg cutter bearing members being in overlapping engagement with said plate portions.

15. In a rotary drill bit, the combination of a shank adapted for engagement to a drill stem for rotation thereby and formed with a pair of downwardly extending integral legs, each leg having a thrust surface; a pair of opposed U-shaped cutter-bearing members detachably affixed to the shank, each said bearing member comprising an upper portion adapted to engage the shank in thrust-transitting relation, a journal bearing portion, and a vertically extending leg joining the upper portion and the journal bearing portion; a second pair of cutter-bearing members mounted one on each shank leg, each of said second-mentioned cutter-bearing members comprising a body adapted to bear against the shank leg thrust surface in load-transmitting relation and to bear against the upper portions of said U-shaped cutter-bearing members to prevent disengagement vertically of said upper portions from the shank, and a journal bearing integral with the body; and a roller cutter rotatably mounted on each of the journal bearings.

16. In a rotary drill bit, the combination of a shank adapted for engagement to a drill stem for rotation thereby and formed with a pair of downwardly extending integral legs, each leg having a substantially plane thrust surface inclined downwardly and outwardly; a pair of opposed U-shaped cutter-bearing members detachably affixed to the shank, each said bearing member comprising a horizontally extending upper portion adapted to engage the shank in thrust-transmitting relation between said shank legs, a journal bearing portion, and a vertically extending leg joining the upper portion and the journal bearing portion; a second pair of cutter-bearing members mounted one on each shank leg, each of said second-mentioned cutter-bearing members comprising a body adapted to bear against the shank leg thrust surface in load-transmitting relation and to bear against the under surfaces of the upper portions of said U-shaped cutter-bearing members to prevent disengagement vertically of said upper portions from the shank, and a journal bearing integral with the body; and a roller cutter rotatably mounted on each of the journal bearings.

17. In a roller bit, a shank, a pair of detachable legs secured to the shank extending downwardly therefrom on opposite sides, a pair of axially alined bearing supports respectively extending toward each other from each leg, a roller cutter rotatably mounted on each support, a thrust bearing for maintaining said cutters in axial position with respect to one another including races formed in adjacent cutter end faces and elements rollable in said races, and means within said bearing supports for holding said legs against relative movement and said cutter races in engagement with said elements.

ROBERT P. FISHER.